United States Patent [19]

Terada et al.

[11] Patent Number: 4,519,650

[45] Date of Patent: May 28, 1985

[54] SEAT BACK FRAME ASSEMBLY FOR AUTOMOBILE SEATS

[75] Inventors: Takami Terada; Hiroshi Nawa; Reiki Kawamura, all of Toyota, Japan

[73] Assignees: Aisin Seiki Kabushiki Kaisha; Toyota Jidosha Kabushiki Kaisha, both of Aichi, Japan

[21] Appl. No.: 473,678

[22] Filed: Mar. 8, 1983

[30] Foreign Application Priority Data

Mar. 9, 1982 [JP] Japan .............................. 57-32699[U]

[51] Int. Cl.³ .............................................. A47C 7/02
[52] U.S. Cl. ...................................... 297/452; 297/410
[58] Field of Search ............... 297/452, 451, 450, 410, 297/391

[56] References Cited

U.S. PATENT DOCUMENTS

| | | | |
|---|---|---|---|
| 2,572,591 | 10/1951 | Booth | 297/450 X |
| 3,173,723 | 3/1965 | Hoven et al. | 297/452 X |
| 3,427,073 | 2/1969 | Downs et al. | 297/410 |
| 3,512,833 | 5/1970 | Sugiura | 297/410 |
| 3,572,831 | 3/1971 | Barecki et al. | 297/410 |
| 3,630,566 | 12/1971 | Barecki | 297/450 |
| 3,874,731 | 4/1975 | Jordan | 297/452 |
| 4,305,617 | 12/1981 | Benoit | 297/452 |
| 4,351,563 | 9/1982 | Hattori | 297/391 |

FOREIGN PATENT DOCUMENTS 2426728 12/1975 Fed. Rep. of Germany ...... 297/410
1156528 6/1969 United Kingdom .

Primary Examiner—Francis K. Zugel
Attorney, Agent, or Firm—Finnegan, Henderson, Farabow, Garrett and Dunner

[57] ABSTRACT

A seat back frame assembly, comprising a substantially U-shaped pipe member having a horizontal base and a pair of vertical legs extending upwardly from the horizontal base and terminating at a pair of upper ends, a transverse member having a first horizontal portion welded at the opposite ends to the upper ends of the pipe member, a first vertical portion depending from the first horizontal portion to extend along one side of the pipe member and having a lower end continuing to a second horizontal portion lying beneath the first horizontal portion between the vetical legs of the pipe member, and a second vertical portion depending from the second horizontal portion along the other side of the pipe member, each of the first and second vertical portions having opposite edge portions welded to the legs of the pipe member, the first horizontal portion having a pair of transversely spaced holes, the second horizontal portion having a pair of holes which are respectively aligned in vertical direction with the holes in the first horizontal portion for receiving headrest receptacles.

2 Claims, 5 Drawing Figures

SEAT BACK FRAME ASSEMBLY FOR AUTOMOBILE SEATS

The present invention relates to an automobile seat structures and more particularly to a seat back frame assembly for an automobile seat.

In conventional automobile seats, the seat back frame assembly has been made essentially of a pipe member which is bent in a rectangular configuration with opposite ends of the pipe member abutted against each other and welded together by butt welding. On the upper horizontal portion of the rectangular pipe member, there are provided a pair of brackets for receiving receptacles for legs of a headrest. Each of the receptacle receiving brackets is of a configuration having an upper and lower horizontal flanges and a vertical wall extending between the upper and lower horizontal flanges. The brackets are attached to the pipe member by welding the vertical walls of the brackets to the upper horizontal portion of the pipe member. In the upper and lower horizontal flanges of each bracket, there are formed vertically aligned holes for receiving a receptacle for the headrest leg.

This type of conventional frame structures have been found inconvenient in that a lot of welding operations have to be performed. At first, the butt welding at the opposite ends of the pipe member is not an easy task in view of the small diameter and thin wall thickness of the pipe member and sufficient strength cannot be ensured. Further, each of the brackets has to be welded to the pipe member at least at four points, namely, at two transversely spaced points in each of the upper and lower sides of the upper horizontal portion of the pipe member. This welding operation is not an easy task, either, and there have been problems of insufficient strength.

It is therefore an object of the present invention to provide an automobile seat back frame assembly which has a sufficient strength.

Another object of the present invention is to provide a seat back frame assembly which can be manufactured without applying a butt welding technique to a pipe member.

A further object of the present invention is to provide a seat back frame assembly in which brackets need not be provided only for receiving receptacles for headrest legs.

According to the present invention, the above and other objects can be accomplished by a seat back frame assembly comprising a substantially U-shaped pipe member having a horizontal base and a pair of vertical legs extending upwardly from the horizontal base and terminating at a pair of upper ends, a transverse member having a first horizontal portion welded at the opposite ends to the upper ends of the pipe member, a first vertical portion depending from said first horizontal portion to extend along one side of said pipe member and having a lower end continuing to a second horizontal portion lying beneath the first horizontal portion between said vertical legs of the pipe member, and a second vertical portion depending from said second horizontal portion along the other side of the pipe member, each of said first and second vertical portions having opposite edge portions welded to the legs of the pipe member, said first horizontal portion having a pair of transversely spaced holes, said second horizontal portion having a pair of holes which are respectively aligned in vertical direction with said holes in the first horizontal portion for receiving headrest receptacles. According to the features of the present invention described above, it is not required to provide specifically for the headrest receptacles and welding operations can be simplified as compared with the conventional structure. Butt welding is no longer required to assemble the frame and the strength and the rigidity of the frame assembly can significantly be increased. The first vertical portion is welded to the pipe member legs at one side of the pipe member, whereas the second vertical portion is welded at the other side. This arrangement makes the structure rigid and weld may not necessarily be so strong so that the welding operation can be performed relatively easily.

The above and other objects and features of the present invention will become apparent from the following descriptions of a preferred embodiment taking reference to the accompanying drawings, in which.

Figure 1:
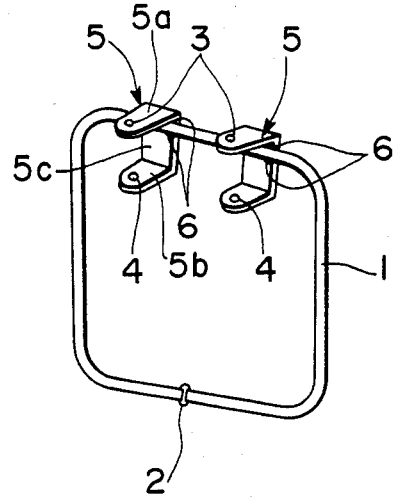
FIG. 1 is a perspective view showing a typical example of a seat back frame in accordance with a conventional design.
Figure 2:
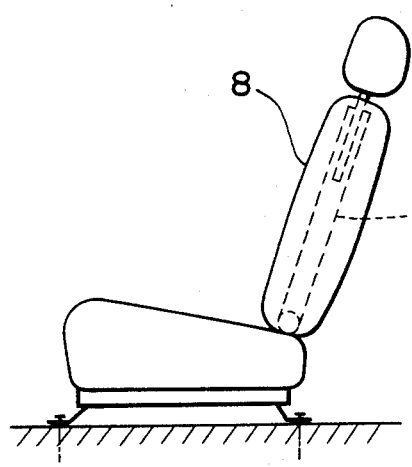
FIG. 2 is a side view of an automobile seat typically showing the arrangement of a seat back and its frame.

Referring to the drawings, particularly to FIG. 2, it will be noted that an automobile seat has a seat back 8 in which a seat back frame assembly 7 is disposed for maintaining the shape of the seat back 8. As shown in FIG. 1, a conventional seat back frame assembly includes a pipe member 1 of a substantially rectangular configuration having opposite end portions abutted against each other and welded together by a butt welding. To the upper horizontal portion of the pipe member 1, there are attached a pair of brackets 5 for receiving receptacles for legs of a headrest. The bracket 5 has a pair of vertically spaced flanges 5a and 5b and a vertical wall 5c extending between the flanges 5a and 5b. The bracket 5 is welded to the upper horizontal portion of the pipe member 1 and formed at the flanges 5a and 5b with vertically aligned holes 3 and 4 for receiving the headrest receptacle. This type of seat back frame structure has disadvantages as described previously.

Figure 3:
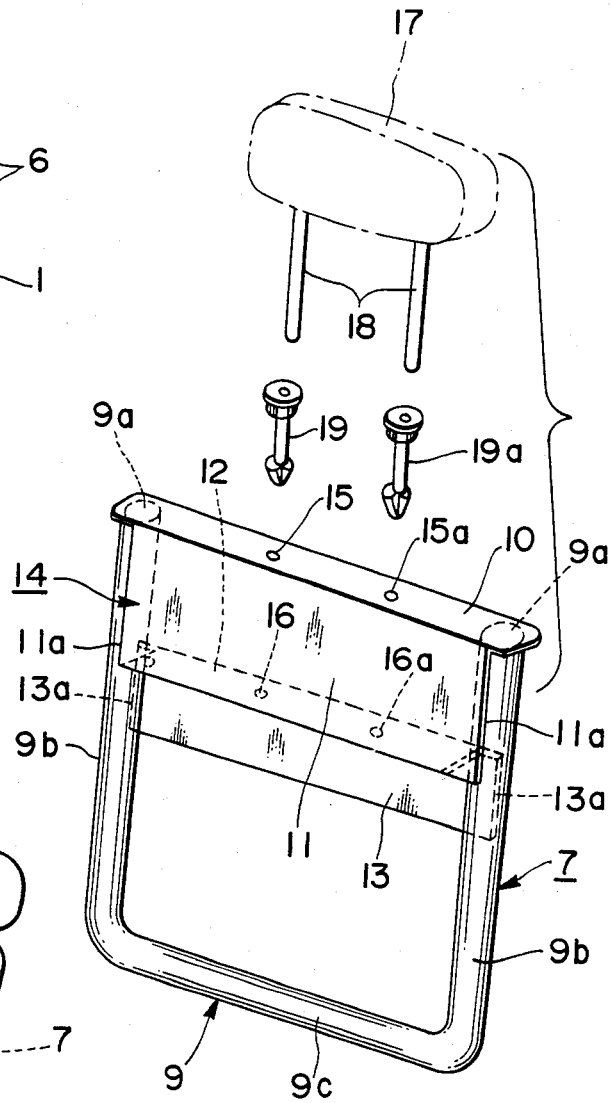
FIG. 3 is a perspective view showing a seat back frame in accordance with one embodiment of the present invention.
Figure 4:
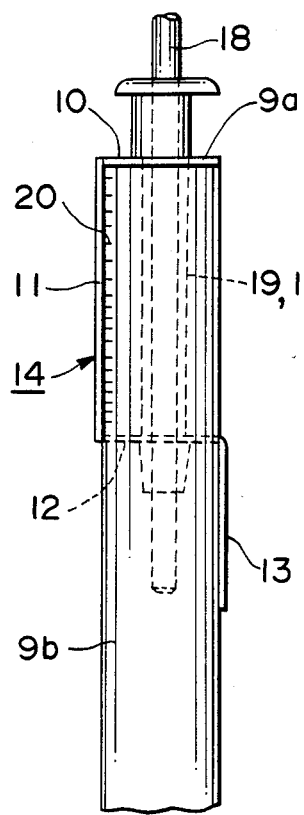
FIG. 4 is a side sectional view in an enlarged scale of the upper portion of the seat back frame shown in FIG. 3; and, FIG. 5 is a front sectional view of the seat back frame shown in FIGS. 3 and 4.
Figure 5:
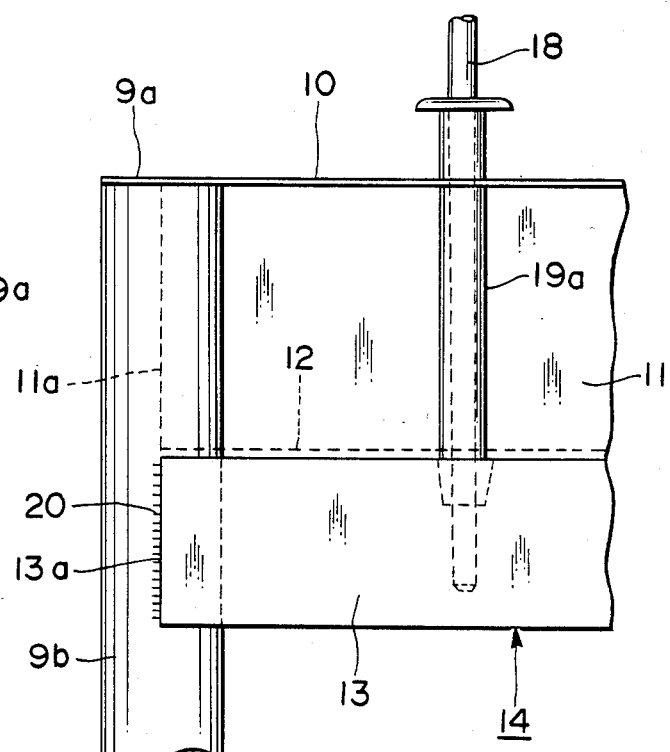

Referring now to FIGS. 3 through 5, it will be noted that the embodiment of the present invention shown therein includes a substantially U-shaped pipe member 9 made of a single piece of pipe material and having a base 9c and a pair of vertical legs 9b extending upwardly from the opposite ends of the base 9c to terminate at upper ends 9a. To the upper portion of the U-shaped pipe member 9, there is attached a transverse member 14 to constitute a seat back frame assembly 7. The transverse member 14 has a first horizontal portion 10 which extends between and welded to the upper ends 9a of the vertical legs 9b of the pipe member 9. The first horizontal portion 10 is contiguous with a first vertical portion 11 which depends from one edge portion of the first horizontal portion 10 so as to extend along one side of the pipe member 9. The first vertical portion 11 has a lower edge portion which is contiguous with a second horizontal portion 12. The second horizontal portion 12 has a transverse length smaller than the spacing between the legs 9b of the pipe member 9. Thus, the second horizontal portion 12 lies beneath the first horizontal portion 10 between the legs 9b of the pipe member 9. The second horizontal portion 12 is contiguous with a second vertical portion 13 which extends downwardly along the opposite side of the pipe member 9. The transverse member is made integrally by a sheet metal and bent to form the previously described configuration.

As shown in FIG. 5, the first vertical portion 11 has a transverse length which is a little smaller than the maximum width of the pipe member 9 and welded along the side edges 11a thereof to one side of the vertical legs 9b of the pipe member 9. Similarly, the second vertical portion 13 has a transverse length which is a litter smaller than the maximum width of the pipe member 9 and welded along the side edges 13a thereof to the other side of the vertical legs 9b of the pipe member 9.

In the first horizontal portion 10 of the transverse member 14, there are formed a pair of transversely spaced holes 15 and 15a. The second horizontal portion 12 is formed with a pair of transversely spaced holes 16 and 16a which are vertically aligned with the holes 15 and 15a in the first horizontal portion 10, respectively. A pair of receptacles 19 and 19a are respectively fitted to the vertically aligned holes 15; 16 and 15a; 16a. A headrest 17 having a pair of legs 18 is mounted on the seat back 8 by fitting the legs 18 to the headrest receptacles 19 and 19a.

The invention has thus been shown and described with reference to a specific embodiment, however, it should be noted that the invention is in no way limited to the details of the illustrated structures but changes and modifications may be made without departing from the scope of the appended claims.

We claim:

1. A seat back frame assembly for mounting a headrest, comprising:
    a substantially U-shaped pipe member having a horizontal base and a pair of vertical legs extending upwardly from the horizontal base and terminating at a pair of respective ends of said vertical legs, and
    a transverse member including:
        first and second horizontal portions, said first horizontal portion welded at the top most ends of said vertical legs, said second horizontal portion extending between said vertical legs and beneath said first horizontal portion,
        a first vertical portion depending from said first horizontal portion extending along the front surface of said pipe member and connecting said first and second horizontal portions,
        a second vertical portion depending from said second horizontal portion and extending along the rear surface of said pipe member, each of the first and second vertical portions having opposite edge portions welded to the legs of said pipe member,
    said first horizontal portion having a pair of transversely spaced first apertures,
    said second horizontal portion having a pair of transversely spaced second apertures and said second apertures being aligned in the vertical direction with said pair of said first apertures, and
    a pair of receptacles, each of said receptacles being positioned within said first and second aperature allowing said headrest to be mounted on said transverse member.

2. A seat back frame for mounting a headrest comprising:
    a substantially U-shaped pipe member having a horizontal base and a pair of vertical legs extending upwardly from said horizontal base and terminating at a pair of respective ends of said vertical legs,
    a transverse member having a first horizontal portion welded at the topmost ends of said vertical legs,
    a first vertical portion depending from said first horizontal portion and extending along the rear surface of said pipe member,
    a second horizontal portion bent horizontally from lower side of said first vertical portion forming a space between said first and second horizontal portions,
    a second vertical portion depending from said second horizontal portion and extending along the front surface of said pipe member,
    said first horizontal portion having a pair of transversely spaced first apertures,
    said second horizontal portion having a pair of transversely spaced second apertures and said second apertures being aligned in the vertical direction with said pair of said first apertures, and
    a pair of receptacles, each of said receptacles being positioned within said first and second aperature allowing said headrest to be mounted on said transverse member.

* * * * *